United States Patent
Schenk

(10) Patent No.: US 10,443,497 B2
(45) Date of Patent: Oct. 15, 2019

(54) ICE PROTECTION SYSTEM FOR GAS TURBINE ENGINES

(71) Applicant: Rolls-Royce Corporation, Indianapolis, IN (US)

(72) Inventor: Peter M. Schenk, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 391 days.

(21) Appl. No.: 15/233,402

(22) Filed: Aug. 10, 2016

(65) Prior Publication Data

US 2018/0045116 A1   Feb. 15, 2018

(51) Int. Cl.
| | |
|---|---|
| *F02C 7/047* | (2006.01) |
| *F02C 3/04* | (2006.01) |
| *F01D 25/02* | (2006.01) |
| *F02C 6/08* | (2006.01) |
| *F02C 7/18* | (2006.01) |

(52) U.S. Cl.
CPC .............. *F02C 7/047* (2013.01); *F01D 25/02* (2013.01); *F02C 3/04* (2013.01); *F02C 6/08* (2013.01); *F02C 7/185* (2013.01); *F05D 2260/205* (2013.01); *F05D 2260/213* (2013.01); *Y02T 50/671* (2013.01); *Y02T 50/676* (2013.01)

(58) Field of Classification Search
CPC .. F02C 7/047; F02C 6/08; F02C 7/185; F01D 25/02; B64D 2033/0233
See application file for complete search history.

(56) References Cited

U.S. PATENT DOCUMENTS

| | | | |
|---|---|---|---|
| 2,648,193 A | 8/1953 | Redding et al. | |
| 2,827,760 A | 3/1958 | Marchant et al. | |
| 2,932,442 A | 4/1960 | Hart et al. | |
| 2,940,258 A | 6/1960 | Lombard et al. | |
| 3,056,014 A | 9/1962 | Hulley et al. | |
| 3,651,645 A | 3/1972 | Grieb | |
| 3,749,336 A * | 7/1973 | Christensen | B64D 15/02 244/134 B |
| 3,933,327 A * | 1/1976 | Cook | B64D 15/04 244/134 B |
| 5,114,103 A | 5/1992 | Coffinberry | |
| 5,305,616 A | 4/1994 | Coffinberry | |
| 5,581,996 A * | 12/1996 | Koch | F01D 5/141 60/266 |
| 6,302,191 B1 | 10/2001 | Wickham et al. | |
| 6,920,748 B2 | 7/2005 | Ackerman et al. | |
| 6,990,797 B2 | 1/2006 | Venkataramani et al. | |
| 7,188,464 B2 | 3/2007 | Ackerman et al. | |
| 7,716,913 B2 | 5/2010 | Rolt | |

(Continued)

FOREIGN PATENT DOCUMENTS

| | | |
|---|---|---|
| CN | 203892024 U | 10/2014 |
| EP | 1087037 A2 | 3/2001 |

(Continued)

OTHER PUBLICATIONS

Extended European Search Report, European Application No. 17181381.9-1607, dated Apr. 1, 2018, 7 pages.

*Primary Examiner* — Gerald L Sung

(74) *Attorney, Agent, or Firm* — Barnes & Thornburg LLP

(57) ABSTRACT

A gas turbine engine includes devices, systems, and methods for de-icing using heat of compression and expelling the de-icing medium into a gas flow path of the engine.

19 Claims, 5 Drawing Sheets

(56) References Cited

U.S. PATENT DOCUMENTS

| | | | |
|---|---|---|---|
| 7,823,374 B2 | 11/2010 | Venkataramani et al. | |
| 8,015,788 B2 | 9/2011 | Stephenson et al. | |
| 8,307,662 B2 | 11/2012 | Turco | |
| 2002/0162914 A1 | 11/2002 | Albero et al. | |
| 2005/0050877 A1* | 3/2005 | Venkataramani | F02C 7/047 60/39.093 |
| 2009/0188234 A1 | 7/2009 | Suciu et al. | |
| 2010/0281880 A1 | 11/2010 | Porte | |
| 2012/0067005 A1 | 3/2012 | Held | |
| 2012/0167579 A1 | 7/2012 | Francisco et al. | |
| 2013/0164115 A1 | 6/2013 | Sennoun | |
| 2013/0160291 A1 | 7/2013 | Broughton et al. | |
| 2013/0175001 A1 | 7/2013 | Cheong | |
| 2014/0182264 A1 | 7/2014 | Weisgerber et al. | |
| 2014/0352315 A1 | 12/2014 | Diaz | |
| 2014/0369812 A1* | 12/2014 | Caruel | F02K 3/06 415/116 |
| 2015/0107261 A1 | 4/2015 | Moes et al. | |
| 2016/0061056 A1* | 3/2016 | Appukuttan | F01D 25/10 415/144 |
| 2016/0090859 A1 | 3/2016 | Aggas | |
| 2016/0102610 A1* | 4/2016 | Caruel | B64D 15/04 244/134 R |
| 2017/0298821 A1* | 10/2017 | Welch | F02C 7/045 |

FOREIGN PATENT DOCUMENTS

| | | | |
|---|---|---|---|
| GB | 702546 A | 1/1954 | |
| GB | 736503 A | 9/1955 | |
| GB | 761435 A | 11/1956 | |
| GB | 850691 A | 10/1960 | |

\* cited by examiner

ICE PROTECTION SYSTEM FOR GAS TURBINE ENGINES

FIELD OF THE DISCLOSURE

The present disclosure relates generally to gas turbine engines, and more specifically to ice protection for gas turbine engine components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller.

In some applications, ice can form on engine components under certain ambient conditions. Removal of ice from engine components can encourage proper engine and aircraft operation.

SUMMARY

The present disclosure may comprise one or more of the following features and combinations thereof.

According to the present disclosure, a gas turbine engine may include a fan mounted to rotate about an axis to draw air into the engine, an engine core that extends along the axis, the engine core including a compressor having an compressor inlet fluidly connected to receive air from the fan and a compressor discharge, a combustor having an combustor inlet fluidly connected to receive compressed air from the compressor discharge and a combustor discharge, and a turbine having a turbine inlet fluidly connected to the combustor discharge to receive combustion products therefrom, and an ice protection system including a heat exchanger having a hot side passage and a cold side passage arranged in thermal communication with each other, wherein the hot side passage is fluidly connected with the compressor discharge to receive compressed air therefrom and is fluidly connected to a downstream target to provide cooled-compressed air thereto, the cold side passage is fluidly connected with an upstream input to receive sink fluid therefrom and is fluidly connected with a de-icing location to provide heated-sink fluid thereto to provide heat for de-icing, the de-icing location is fluidly connected by a conduit with a dump point that is located within an engine gas flow path to expel spent sink fluid received from the de-icing location.

In some embodiments, the dump point may be upstream of the compressor inlet. In some embodiments, the dump point may be located such that expelled sink fluid is introduced into a flow of air that includes at least a portion of air sent to a bypass duct when the gas turbine engine is operating.

In some embodiments, the dump point is located downstream of the fan. In some embodiments, the dump point may be located such that expelled sink fluid is introduced into a flow of air that includes at least a portion of air sent to the compressor inlet when the gas turbine engine is operating.

In some embodiments, the conduit may include a valve that is positionable in a de-icing position configured to communicate heated-sink fluid to the de-icing location and an exhaust position configured to communicate heated-sink fluid to an exhaust location.

In some embodiments, the upstream input may include at least one of a discharge of the fan, a bypass duct, and an intermediate extraction of the compressor.

In some embodiments, the de-icing location may be proximate to at least one of an inlet strut, inlet guide vane, a variable inlet guide vane, a forward frame, and an airframer port of the engine. In some embodiments, the downstream target may include a number of cooling ports of the turbine. In some embodiments, the upstream input may include an extraction from the compressor.

According to another aspect of the present disclosure, a gas turbine engine may include an engine core including a compressor, a combustor, and a turbine, an outer bypass duct surrounding the engine core, and the outer bypass duct and the engine core collectively defining an engine gas flow path, and an ice protection system including a heat exchanger having a hot side passage and a cold side passage arranged in thermal communication with each other, the hot side passage is fluidly connected with the compressor to receive compressed fluid therefrom and is fluidly connected with a downstream target to provide cooled-compressed fluid thereto, the cold side passage is fluidly connected with an upstream input to receive sink fluid therefrom and is fluidly connected with a de-icing location to provide heated-sink fluid thereto to provide heat for de-icing, and the de-icing location is fluidly connected with a dump point within the engine gas flow path to expel cooled-sink fluid received from the de-icing location.

In some embodiments, the dump point may be upstream of the compressor. In some embodiments, the dump point may be located such that cooled-sink fluid is introduced into a flow of air that includes at least a portion of air received by the outer bypass duct when the gas turbine engine is operating.

In some embodiments, the dump point may be downstream from a propeller coupled to be driven by the engine core. In some embodiments, the dump point may be located such that cooled-sink fluid is introduced into a flow of air that includes at least a portion of air received the compressor when the gas turbine engine is operating.

In some embodiments, the conduit may include a valve that is positionable in a de-icing position to communicate heated-sink fluid to the de-icing location and an exhaust position to communicate heated-sink fluid to an exhaust location.

In some embodiments, the upstream input may include at least one of a discharge of a propeller, the outer bypass duct, and an intermediate extraction of the compressor.

In some embodiments, the de-icing location may be proximate to at least one of an inlet strut, an inlet guide vane, a variable inlet guide vane, a forward frame, and an airframer port of an aircraft. In some embodiments, the downstream target may include a number of cooling ports of the turbine. In some embodiments, the upstream input may include an extraction from the compressor.

These and other features of the present disclosure will become more apparent from the following description of the illustrative embodiments.

DETAILED DESCRIPTION OF THE DRAWINGS

Figure 1:
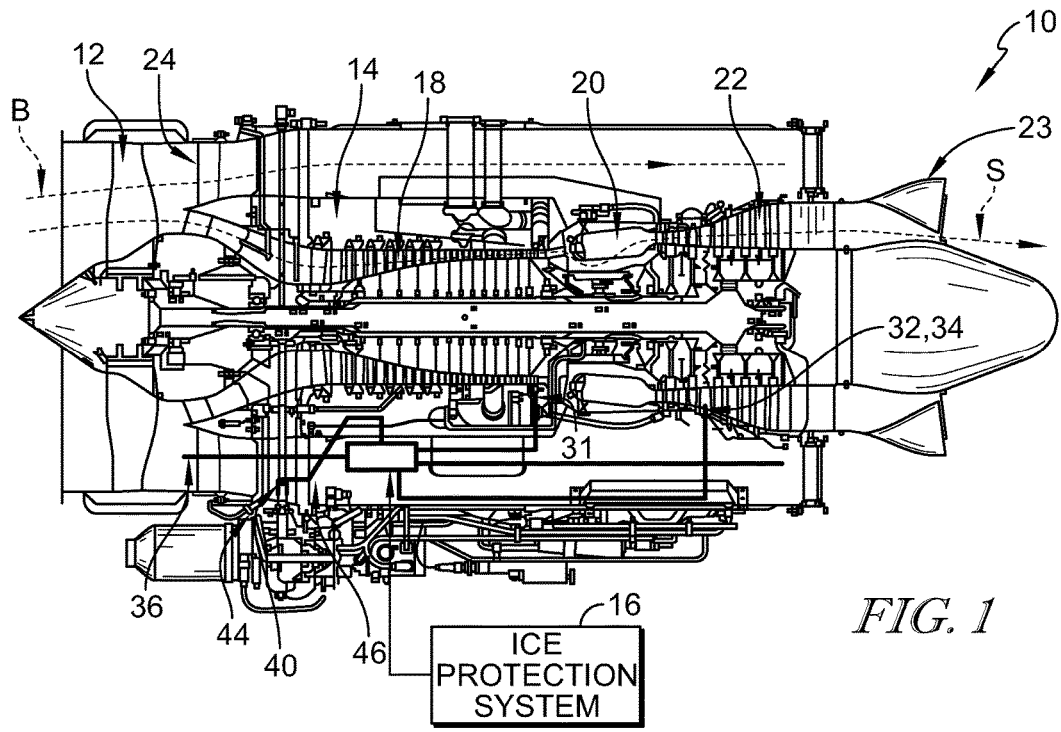
FIG. 1 is an elevation view of a gas turbine engine in cross-section to show that the gas turbine engine includes a fan, and an ice protection system having a heat exchanger that receives a (hot) source fluid and a (cold) sink fluid to exchange heat to warm the sink fluid and provides the warmed sink fluid to components of the engine for de-icing.

For the purposes of promoting an understanding of the principles of the disclosure, reference will now be made to a number of illustrative embodiments illustrated in the drawings and specific language will be used to describe the same.

An illustrative embodiment of a gas turbine engine 10 is shown in FIG. 1. The gas turbine engine 10 illustratively includes a fan 12 for drawing air into the engine 10, an engine core 14 for compressing, combusting, and expanding the air from the fan 12, and an ice protection system 16 for de-icing components of the engine 10. The fan 12 also discharges air to provide thrust. The engine core 14 illustratively includes a compressor 18 for compressing air from the fan 12, a combustor 20 for mixing the compressed air with fuel and combusting the mixture to yield exhaust product, and a turbine 22 that converts the force of expanding exhaust products into rotational force as shown in FIG. 1.

The engine 10 illustratively includes an outer bypass duct 24 disposed around the engine core 14 to receive bypass air flow B from the fan 12 as shown in FIG. 1. A core flow S is defined by the flow of air into the fan 12 and the compressor 18, and into the combustor 20 and combusted into combustion products, and the combustion products expanded within the turbine 22 and discharged into a tail section 23 of the engine 10. The bypass air flow B and the core flow S collectively define an engine gas flow. Particularly, at locations upstream of the compressor 18, ice deposits can form on engine components along the path of the engine gas flow depending on operational conditions, for example, ambient temperatures and engine conditions.

In the illustrative embodiment as shown in FIG. 1, the ice protection system 16 is operable to transfer heat to locations and/or components of the engine 10 to remove and/or discourage ice formation (de-icing). The ice protection system 16 illustratively includes a heat exchanger 26 (best shown in FIG. 2) for transferring heat between a heat source fluid and a heat sink fluid. By extracting heat from specific locations of the engine 10 engine efficiency can be maintained while minimizing the pressure drop required to transport the heat transfer medium to perform de-icing.

Figure 2:
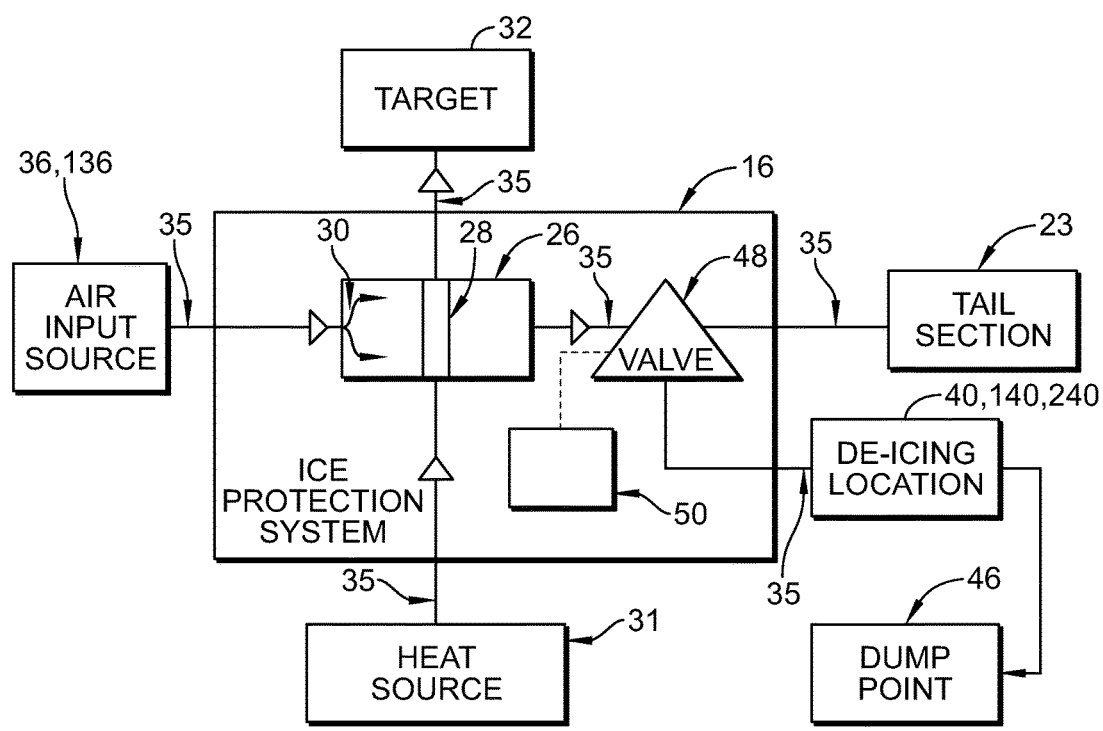
FIG. 2 is a diagrammatic view of the ice protection system of the gas turbine engine of FIG. 1 showing that the heat exchanger includes a hot (source) side passage and a cold (sink) side passage in thermal communication with each other showing that the hot (source) side passage receives (hot) source fluid from a compressor included in the engine core and discharges cooled (source) fluid downstream showing that the cold (sink) side passage receives (cold) sink fluid from an upstream source and provides warmed sink fluid into a de-icing location to de-ice a component (strut) of the engine; and showing that the de-icing location is fluidly connected to a dump point to discharge spent sink fluid into the core flow path of the engine.

As best shown in FIG. 2, the heat exchanger 26 illustratively includes a heat source passage 28 and a heat sink passage 30 arranged in thermal communication with each other. In the illustrative embodiment, the heat source passage 28 is fluidly connected with a heat source to receive heat source fluid therefrom. The heat source 31 is illustratively embodied as a final discharge stage of the compressor 18 and the heat source fluid is embodied as compressed air from the discharge of the compressor 18 as shown in FIG. 1. In the illustrative embodiment, the heat source passage 28 is fluidly connected on a downstream side to a target 32, illustratively embodied as cooling ports 34 of turbine 22.

In the illustrative embodiment as shown in FIG. 2, the heat exchanger 26 is in fluid connection with various components through passageways 35 embodied as a network of flow paths formed within engine components and/or within dedicated conduits. In some embodiments, the passageways 35 may take any suitable form for transporting the respective fluids.

In the illustrative embodiment as shown in FIG. 2, the heat sink passage 30 is fluidly connected with a heat sink to receive heat sink fluid therefrom. The heat sink is illustratively embodied as an air input source 36. In the illustrative as shown in FIG. 1, the air input source 36 is embodied as air from the fan 12, and particularly bypass air from the outer bypass duct 24. Air from the air input source 36 illustratively flows through the heat sink passage 30 and receives heat from the heat source fluid within the heat source passage 28.

In the illustrative embodiment as shown in FIG. 2, the heat sink passage 30 is fluidly connected to a de-icing location 40 of the engine 10. The heat sink fluid having received heat from the heat source fluid provides heat to de-ice the de-icing location 40. As best shown in FIG. 1, the de-icing location 40 is illustratively embodied to be located near a strut 42 (best shown in FIG. 3) of a front frame 44 of the engine 10. The heat sink fluid flows to the de-icing location 40 and provides heat for de-icing and continues as cooled-heat sink fluid.

In the illustrative embodiment as shown in FIG. 2, the heat sink passage 30 is also fluidly connected to the exhaust flow at the tail section 23 of the engine 10. A valve 48 is disposed along the passageways 35 between the heat exchanger 26 and each of the de-icing location 40 and the tail section 23. The valve 48 is illustratively positionable between a de-icing position that directs all flow to the de-icing location 40 and an exhaust position that directs all flow to the tail section 23, and various modulated positions in between. The valve 48 is illustratively controllable through a main control system 50 of the engine 10 across the range of positions to selectively proportion heat sink fluid between the de-icing location 40 and the tail section 23 based on the de-icing requirements according to the main control system 50.

As shown in FIGS. 1 and 2, the de-icing location 40 is fluidly connected to a dump point 46 to expel cooled-heat sink fluid. In the illustrative embodiment as shown in FIG. 1, the dump point 46 is embodied as located within the bypass flow path B. In some embodiments, the dump point 46 may be located anywhere within the engine gas flow path between the fan 12 and the compressor 18. The cooled-heat sink fluid that provided heat for de-icing is expelled into the engine gas flow path to mix with air from the fan 12 entering the compressor 18.

Figures 3, 4:
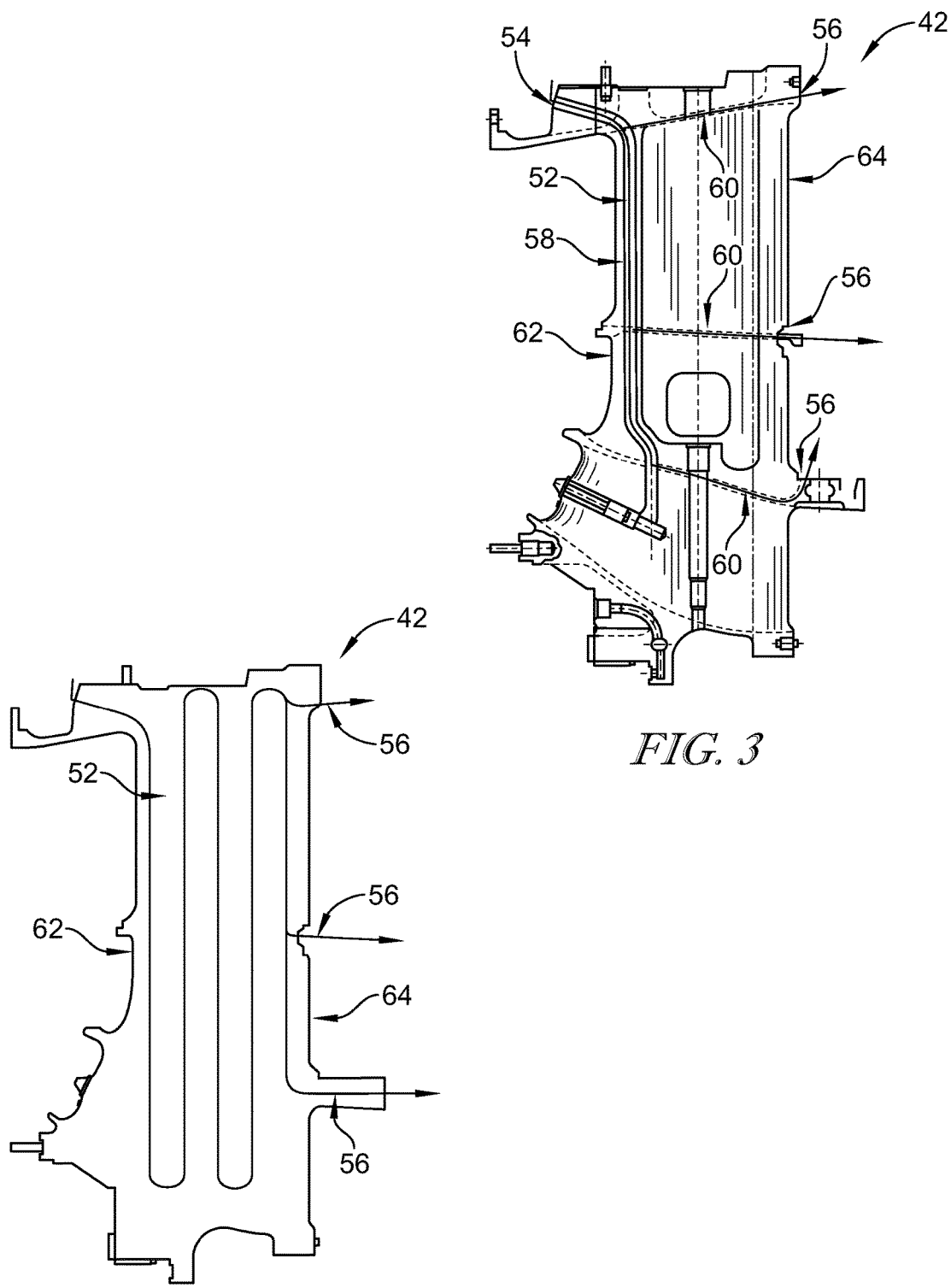
FIG. 3 is an elevation view of an illustrative embodiment of a strut included in the gas turbine engine of FIG. 1 showing that the strut includes a de-icing flow path defined therein for receiving warmed sink fluid from the heat exchanger for de-icing and expelling to the dump point.
FIG. 4 is an elevation view of another illustrative embodiment of the strut of the gas turbine engine of FIG. 1 showing that the strut includes a de-icing flow path defined therein and having a serpentine arrangement for receiving warmed sink fluid from the heat exchanger for de-icing and expelling to the dump point.

As shown in the illustrative embodiment of FIG. 3, the de-icing location 40 is embodied as the strut 42 of the front frame 44 of the engine 10. The strut 42 illustratively includes a de-icing passage 52 formed therein and adapted for receiving the heat sink fluid therethrough to transfer heat for de-icing to the strut 42. The de-icing passage 52 illustratively includes an inlet 54 fluidly connected to the heat sink passage 30 by the passageways 35 to receive a flow of heat sink fluid, a number of outlets 56 for expelling spent heat sink fluid to the dump point 46, and portions 58, 60 extending between the inlet 54 and outlets 56 to transfer heat to the strut 42.

As shown in FIG. 3, the portion 58 illustratively extends near to a front edge 62 of the strut 42 to provide de-icing at the upstream side of the strut 42. The portions 60 illustratively extend from the portion 58 at different radial positions towards a rear edge 64 to expel spent heat sink fluid from the outlets 56 to the dump point 46 within the engine gas flow. In the illustrative embodiment, the strut 42 is formed with an airfoil shape and the dump point 46 is within the bypass air flow of the outer bypass duct 24. In some embodiments, the outlets 56 may connect with additional passageways 35 which connect with the dump point 46 that may be positioned within another section of the engine gas flow path, for example, within the core flow path. In some embodiments as shown in FIG. 4, the de-icing passage 52 may form other flow paths, such as a serpentine path, through the strut 42.

Figure 5:
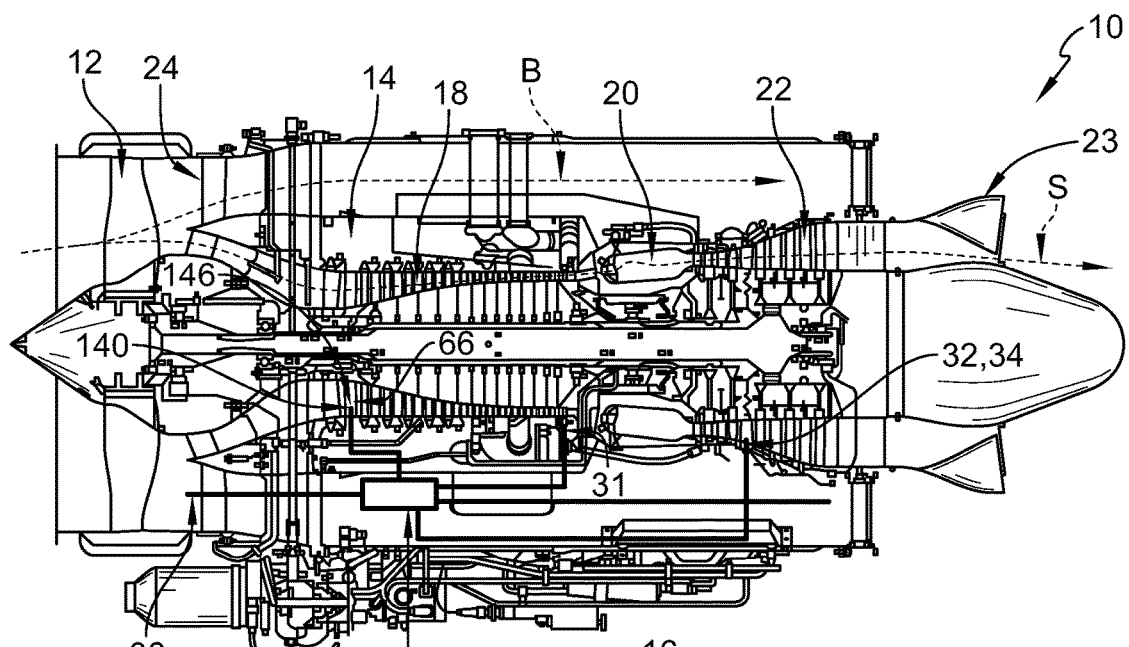
FIG. 5 is an elevation view of the gas turbine engine of FIG. 1 in cross-section to show that the ice protection system is arranged to provide warmed sink fluid to a variable inlet guide vane of the compressor as the de-icing location for de-icing.

Referring now to FIG. 5, the gas turbine engine 10 illustratively includes another embodiment of the ice protection system 16 that includes the heat exchanger 26 having the heat source passage 28 and the heat sink passage 30. However, in the illustrative embodiment as shown in FIG. 5, the heat sink passage 30 is fluidly connected with a de-icing location 140 that is located near to a variable inlet guide vane 66 of the compressor 18. The heat sink passage 30 illustratively receives heat sink fluid as bypass air from the bypass air flow B for heat exchange with the heat source fluid within the heat source passage 28.

Figure 6:
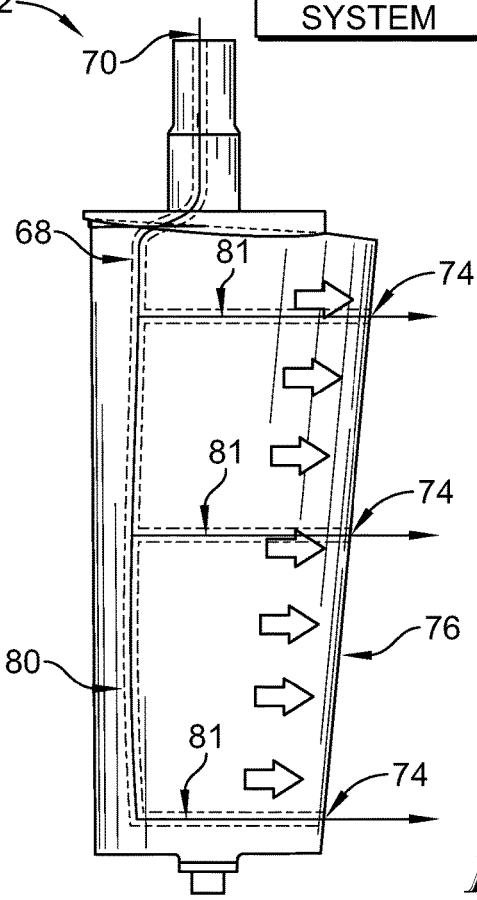
FIG. 6 is an elevation view of the variable inlet guide vane of FIG. 5 showing that the guide vane includes a de-icing flow path defined therein for receiving warmed sink fluid from the heat exchanger for de-icing and expelling to the dump point.

As shown in FIG. 5, the heat sink fluid having received heat from the heat source fluid flows from the heat sink passage 30 to the de-icing location 140, embodied as the variable inlet guide vane 66. As shown in FIG. 6, the variable inlet guide vane 66 illustratively includes a de-icing passage 68 formed therein and adapted for receiving the heat sink fluid therethrough to transfer heat for de-icing to the variable inlet guide vane 66.

As shown in FIG. 5, the de-icing passage 68 illustratively includes an inlet 70 disposed on an outward connection end 72 of the variable inlet guide vane 66 that is fluidly connected to the heat sink passage 30 by the passageways 35 to receive a flow of heat sink fluid, outlets 74 disposed on a rear edge 76 of the variable inlet guide vane 66 for expelling spent heat sink fluid to a dump point 146, and a portions 80, 81 that extends between the inlet 70 and outlets 74. The portion 80 illustratively extends along the variable inlet guide vane 66 near to an inlet edge 82 and each portion 81 extends from the portion 80 for connection with one of the outlets 74. In the illustrative embodiment as shown in FIG. 5, the dump point 146 is located at the outlets 74 within the inlet of the compressor 18 such that heat sink fluid is expelled into the engine gas flow path, and particularly the core flow path S. In some embodiments, the de-icing passage 68 may include a serpentine path similar to that of the strut 42 shown in FIG. 4.

Figure 7:
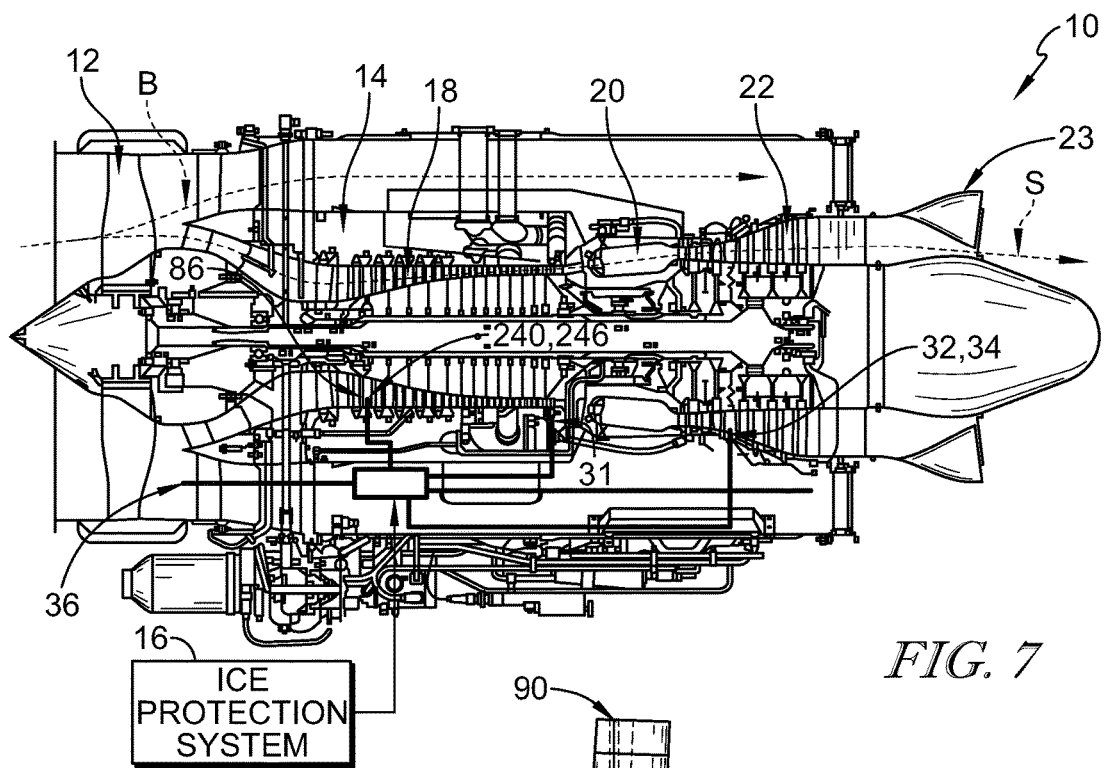
FIG. 7 is an elevation view of the gas turbine engine of FIG. 1 in cross-section to show that the ice protection system is arranged to provide warmed sink fluid to a first stage vane of the compressor as the de-icing location for de-icing.

Referring now to FIG. 7, the gas turbine engine 10 illustratively includes another embodiment of the ice protection system 16 that includes the heat exchanger 26 having the heat source passage 28 and the heat sink passage 30. However, in the illustrative embodiment as shown in FIG. 7, the heat sink passage 30 is fluidly connected with a de-icing location 240 that is located near to a first stage vane 86 of the compressor 18. The heat sink passage 30 illustratively receives heat sink fluid as bypass air from the bypass air flow B for heat exchange with the heat source fluid within the heat source passage 28.

Figure 8:
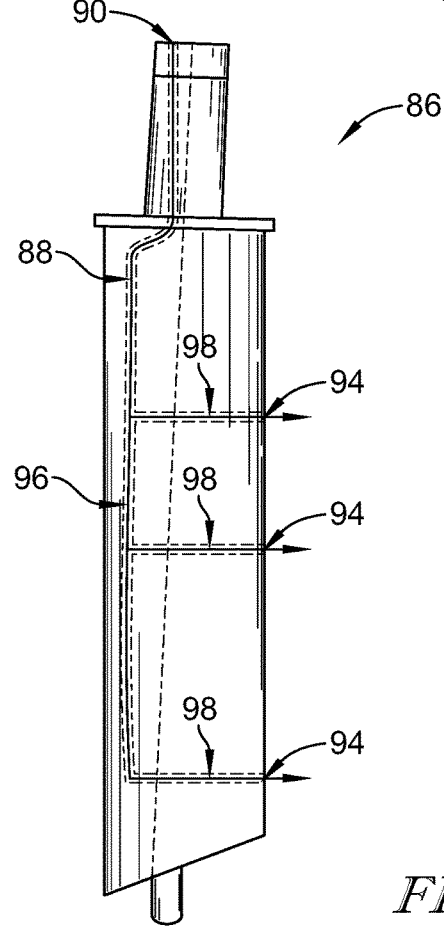
FIG. 8 is an elevation view of the first stage vane of FIG. 7 showing that the vane includes a de-icing flow path defined therein for receiving warmed sink fluid from the heat exchanger for de-icing and expelling to the dump point.

As shown in FIG. 7, the heat sink fluid having received heat from the heat source fluid flows from the heat sink passage 30 to the de-icing location 240, embodied as the first stage vane 86. As shown in FIG. 8, the first stage vane 86 illustratively includes a de-icing passage 88 formed therein and adapted for receiving the heat sink fluid therethrough to transfer heat for de-icing to the first stage vane 86. The de-icing passage 88 illustratively includes an inlet 90 disposed on an outward end, outlets 92 disposed on a rear edge 94 for expelling spent heat sink fluid to a dump point 246, and portions 96, 98 connecting the inlet 90 with the outlets 92.

Figure 9:
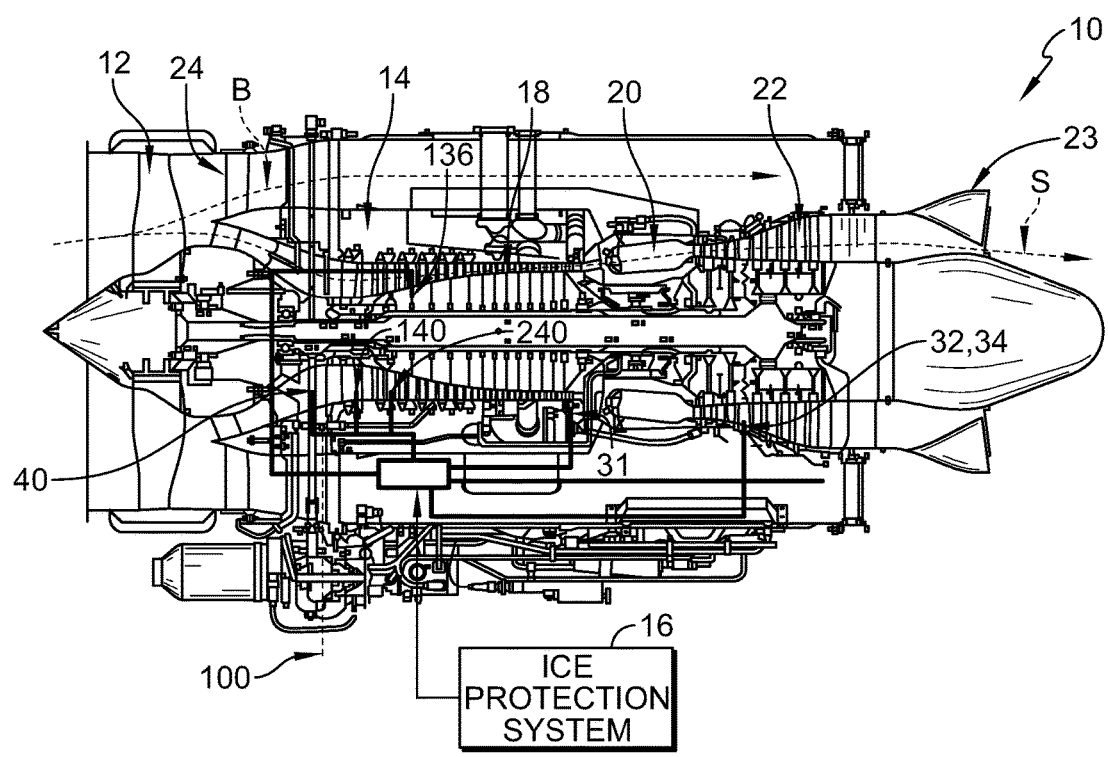
FIG. 9 is an elevation view of the gas turbine engine of FIG. 1 in cross-section to show that the ice protection system is arranged to provide warmed sink fluid to each of the strut, the variable inlet guide vane, and the first stage vane of the compressor each as a de-icing location for de-icing.

Referring now to FIG. 9, the gas turbine engine 10 illustratively includes another embodiment of the ice protection system 16 that includes the heat exchanger 26 having the heat source passage 28 and the heat sink passage 30. However, in the illustrative embodiment as shown in FIG. 9, the heat sink passage 30 is fluidly connected with an air input source 136 that is embodied as an extraction from an intermediate stage 38 of the compressor 18 and is fluidly connected with each of the de-icing locations 40, 140, 240. Thus, the ice protection system 16 can distribute heat sink fluid to any of the de-icing locations 40, 140, 240 for de-icing. In the illustrative embodiment, a single valve 48 is arranged to collectively control flow for the de-icing locations 40, 140, 240, but in some embodiments, the heat sink fluid may be controlled individually for each de-icing location 40, 140, 240. Optionally, another de-icing location 100 may include an airframer's port which provides heat sink fluid outside of the gas turbine engine 10 for use in de-icing other aircraft components.

Although the air input source 136, embodied as an extraction from an intermediate stage 38 of the compressor 18, is described with respect to FIG. 9, the present disclosure includes the use of the air input source 136 in place of the air input source 36 with any of the earlier FIGS. 1-8 and descriptions.

The various details of each of the illustrative embodiments are applicable to each other illustrative embodiment, except where conflict would occur with the specific descriptions of the applicable other illustrative embodiment. The present disclosure includes gas turbine engines having ice protection systems including heat exchangers that are cooled via air from either the early stages of the compressor or from the fan bypass air (as cooling air). The cooling air is then diverted to any of the front strutted case, the variable inlet guide vanes (VIGV), and/or the compressor first stage vane as needed for anti-icing purposes. The remainder (or, when the system isn't needed, all of the cooling air) is vented to the exhaust (tail end, mixer) after it passes through the heat exchanger. Compressed air for cooling within the turbine is extracted from the gas path at the compressor discharge location, routed through the heat exchanger to remove some heat, and then is injected into the turbine to perform cooling and/or purging, for example turbine blade cooling.

The strut, variable inlet guide vanes, and first stage compressor vanes serve as examples of components that may have anti-ice air directed into it, although some embodiments may direct anti-ice air to any number of locations within the engine and/or outside the engine, for example, to airframer ports. In the illustrative embodiments, each of the strut, variable inlet guide vane, and first stage compressor vanes may comprise an airfoil shape, may be formed of metal, and may include some interior hollow space for the anti-ice air to be routed through as internal passages to transfer heat to the surface (which may be illustratively formed of metals, ceramics, and/or any other suitable materials). Anti-ice air may then flow out of the trailing edges and into the gas path.

In order to improve anti-icing function, heat should transfer well from the fluid (gas) to the surface. That heat transfer can be enhanced with a continuous flow as opposed to a dead headed cavity. Flow, in the illustrative embodiments, is provided by exhausting the fluid into the gas path. Expelling the spent anti-ice air into the gas path (as opposed to the nacelle) is simple, reduces travel length, requires no redirection (and/or redirection equipment which can reduce components and weight), and demands less pressure from the source. Routing air back out of the hollow vanes and into the nacelle lengthens the amount of travel and requires that the air be directed once it exits the engine core, likely though supplemental components.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a fan mounted to rotate about an axis to draw air into the gas turbine engine,
an engine core that extends along the axis and defines an engine gas flow path, the engine core including a compressor having a compressor inlet fluidly connected to receive the air from the fan and a compressor discharge, a combustor having a combustor inlet fluidly connected with the compressor discharge and a combustor discharge, and a turbine having a turbine inlet fluidly connected to the combustor discharge to receive combustion products therefrom, and
an ice protection system including a heat exchanger having a hot side passage and a cold side passage arranged in thermal communication with each other, wherein the hot side passage is fluidly connected with the compressor discharge to receive compressed air therefrom and is fluidly connected to a downstream target comprising a component of the turbine to provide cooled-compressed air thereto, the cold side passage is fluidly connected with an upstream input to receive sink fluid therefrom and is fluidly connected with a de-icing location to provide heated-sink fluid thereto to provide heat for de-icing, the de-icing location is fluidly connected by a conduit with a dump point that is located downstream of the fan within the engine gas flow path to expel spent sink fluid received from the de-icing location.

2. The gas turbine engine of claim 1, wherein the dump point is upstream of the compressor inlet.

3. The gas turbine engine of claim 1, wherein the dump point is located such that expelled sink fluid is introduced into a flow of air that includes at least a portion of air sent to a bypass duct when the gas turbine engine is operating.

4. The gas turbine engine of claim 1, wherein the dump point is located such that expelled sink fluid is introduced into a flow of air that includes at least a portion of air sent to the compressor inlet when the gas turbine engine is operating.

5. The gas turbine engine of claim 1, wherein the conduit includes a valve that is positionable in a de-icing position configured to communicate heated-sink fluid to the de-icing location and an exhaust position configured to communicate heated-sink fluid to an exhaust location.

6. The gas turbine engine of claim 1, wherein the upstream input includes at least one of a discharge of the fan, a bypass duct, and an intermediate extraction of the compressor.

7. The gas turbine engine of claim 1, wherein the de-icing location is proximate to at least one of an inlet strut, inlet guide vane, a variable inlet guide vane, a forward frame, and an airframer port of the gas turbine engine.

8. The gas turbine engine of claim 1, wherein the downstream target includes a number of cooling ports of the turbine.

9. The gas turbine engine of claim 1, wherein the upstream input includes an extraction from the compressor.

10. A gas turbine engine comprising
an engine core including a compressor, a combustor, and a turbine,
an outer bypass duct surrounding the engine core, and the outer bypass duct and the engine core collectively defining an engine gas flow path, and
an ice protection system including a heat exchanger having a hot side passage and a cold side passage arranged in thermal communication with each other, the hot side passage is fluidly connected with the compressor to receive compressed fluid therefrom and is fluidly connected with a downstream target comprising a component of the turbine to provide cooled-compressed fluid thereto, the cold side passage is fluidly connected with an upstream input to receive sink fluid therefrom and is fluidly connected with a de-icing location to provide heated-sink fluid thereto to provide heat for de-icing, and the de-icing location is fluidly connected with a dump point located downstream from a propeller coupled to be driven by the engine core within the engine gas flow path to expel cooled-sink fluid received from the de-icing location.

11. The gas turbine engine of claim 10, wherein the dump point is upstream of the compressor.

12. The gas turbine engine of claim 10, wherein the dump point is located such that cooled-sink fluid is introduced into a flow of air that includes at least a portion of air received by the outer bypass duct when the gas turbine engine is operating.

13. The gas turbine engine of claim 10, wherein the dump point is located such that cooled-sink fluid is introduced into a flow of air that includes at least a portion of air received by the compressor when the gas turbine engine is operating.

14. The gas turbine engine of claim 10, wherein the conduit includes a valve that is positionable in a de-icing position to communicate heated-sink fluid to the de-icing location and an exhaust position to communicate heated-sink fluid to an exhaust location.

15. The gas turbine engine of claim 10, wherein the upstream input includes at least one of the discharge of a propeller, the outer bypass duct, and an intermediate extraction of the compressor.

16. The gas turbine engine of claim 10, wherein the de-icing location is proximate to at least one of an inlet strut, an inlet guide vane, a variable inlet guide vane, a forward frame, and an airframer port of an aircraft.

17. The gas turbine engine of claim 10, wherein the downstream target includes a number of cooling ports of the turbine.

18. The gas turbine engine of claim 10, wherein the upstream input includes an extraction from the compressor.

19. A gas turbine engine comprising
a fan mounted to rotate about an axis to draw air into the gas turbine engine,
an engine core that extends along the axis and defines an engine gas flow path, the engine core including a compressor having a compressor inlet fluidly connected to receive the air from the fan and a compressor discharge, a combustor having a combustor inlet fluidly connected with the compressor discharge and a combustor discharge, and a turbine having a turbine inlet fluidly connected to the combustor discharge to receive combustion products therefrom, and
an ice protection system including a heat exchanger having a hot side passage and a cold side passage arranged in thermal communication with each other, wherein the hot side passage is fluidly connected with the compressor discharge to receive compressed air therefrom and is fluidly connected to a downstream target comprising a component of the turbine to provide cooled-compressed air thereto, the cold side passage is fluidly connected with an upstream input to receive sink fluid therefrom and is fluidly connected with a de-icing location to provide heated-sink fluid thereto to provide heat for de-icing, the de-icing location is connected with a dump point by a conduit to communicate spent sink fluid received from the de-icing location, wherein the conduit includes a valve that is selectively positionable between a de-icing position for communicating heated-sink fluid to the de-icing location and an exhaust position for communicating heated-sink fluid into an exhaust flow within a tail section of the engine core.

* * * * *